United States Patent
Osumi

(10) Patent No.: US 9,945,305 B2
(45) Date of Patent: Apr. 17, 2018

(54) SUPERCHARGING CONTROL DEVICE OF INTERNAL COMBUSTION ENGINE

(71) Applicant: DENSO CORPORATION, Kariya, Aichi-pref. (JP)

(72) Inventor: Naoki Osumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 14/595,427

(22) Filed: Jan. 13, 2015

(65) Prior Publication Data
US 2015/0204257 A1 Jul. 23, 2015

(30) Foreign Application Priority Data
Jan. 17, 2014 (JP) ..................... 2014-6790

(51) Int. Cl.
*F02D 41/00* (2006.01)
*F02D 41/10* (2006.01)
(Continued)

(52) U.S. Cl.
CPC .......... *F02D 41/0007* (2013.01); *F02B 33/44* (2013.01); *F02B 37/183* (2013.01); *F02B 37/22* (2013.01); *F02D 23/00* (2013.01); *F02D 41/0062* (2013.01); *F02D 41/10* (2013.01); *F02D 41/18* (2013.01);
(Continued)

(58) Field of Classification Search
CPC .. F02D 41/0007; F02D 41/001; F02D 41/006; F02D 41/0062; F02D 41/10; F02D 41/18; F02D 2041/001; F02D 2200/0406; F02D 2200/101; Y02T 10/144; Y02T 10/47; F02B 37/18; F02B 37/183; F02B 37/186; F02B 37/22; F02B 37/24
See application file for complete search history.

(56) References Cited

U.S. PATENT DOCUMENTS 6,968,269 B2 * 11/2005 Yamashita ............ F02D 41/009
123/406.58
7,107,978 B2 * 9/2006 Itoyama ................. F02M 26/47
123/399
(Continued)

FOREIGN PATENT DOCUMENTS

JP 2006-348853 12/2006

OTHER PUBLICATIONS

Office Action (3 pages) dated Jan. 26, 2016, issued in corresponding Japanese Application No. 2014-006790 and English translation (5 pages).

*Primary Examiner* — Phuttiwat Wongwian
*Assistant Examiner* — Jessica Kebea
(74) *Attorney, Agent, or Firm* — Nixon & Vanderhye P.C.

(57) ABSTRACT

An engine control system performs a first control in the first place at the time of acceleration. Then, when an actual supercharging pressure is increased to a specified supercharging pressure, the engine control system performs a second control. In this way, at the time of acceleration, a turbine capacity and a valve overlap amount of an intake valve and an exhaust valve of an engine are optimized in correspondence to a driving state of an engine, whereby the intake valve and the exhaust valve of the engine can be made to overlap each other on the condition that a scavenging effect is larger than the effect of an exhaust interference during a valve overlap period.

6 Claims, 6 Drawing Sheets

(51) Int. Cl.

| | |
|---|---|
| *F02D 41/18* | (2006.01) |
| *F02B 23/00* | (2006.01) |
| *F02B 37/18* | (2006.01) |
| *F02B 37/22* | (2006.01) |
| *F02B 37/24* | (2006.01) |
| *F02B 33/44* | (2006.01) |
| *F02D 23/00* | (2006.01) |

(52) U.S. Cl.
CPC ............... *F02D 2041/001* (2013.01); *F02D 2200/0406* (2013.01); *F02D 2200/101* (2013.01); *Y02T 10/144* (2013.01); *Y02T 10/47* (2013.01)

(56) References Cited

U.S. PATENT DOCUMENTS

| | | | | |
|---|---|---|---|---|
| 8,099,228 B2* | 1/2012 | Ogawa | ............ | F02B 25/145 123/90.15 |
| 8,220,263 B2* | 7/2012 | Tomoda | ............ | F02D 13/0261 123/90.15 |
| 8,925,315 B2* | 1/2015 | Nordstrand | ............ | F01L 1/181 123/150 |
| 8,973,563 B2* | 3/2015 | Eiraku | ............ | F02D 13/0261 123/676 |
| 2011/0054760 A1 | 3/2011 | Ogawa et al. | | |
| 2012/0060494 A1 | 3/2012 | Sato et al. | | |
| 2014/0224227 A1* | 8/2014 | Yoshizaki | ............ | F02D 41/0007 123/559.1 |
| 2014/0373816 A1* | 12/2014 | Nagar | ............ | F02D 41/0007 123/51 B |

\* cited by examiner

SUPERCHARGING CONTROL DEVICE OF INTERNAL COMBUSTION ENGINE

CROSS REFERENCE TO RELATED APPLICATION

This application is based on Japanese Patent Application No. 2014-006790 filed on Jan. 17, 2014, the disclosure of which is incorporated herein by reference.

TECHNICAL FIELD

The present disclosure relates to a supercharging control device of an internal combustion engine including: a supercharger for supercharging air to be suctioned into a cylinder of an internal combustion engine by the use of an exhaust pressure of the internal combustion engine and for sending a compressed air supercharged in this manner into the cylinder of the internal combustion engine; a turbine capacity varying device capable of varying a turbine capacity of the supercharger; an intake valve timing varying device capable of varying a valve timing of an intake valve of the internal combustion engine; and an exhaust valve timing varying device capable of varying a valve timing of an exhaust valve of the internal combustion engine.

BACKGROUND

There is publicly known a supercharging control device of an internal combustion engine including: a turbocharger of a variable displacement type in which air is supercharged by the use of an exhaust pressure of an internal combustion engine (engine); a variable nozzle capable of varying a turbine capacity of the turbocharger; and a variable-valve-timing controller for varying a valve opening characteristic of an intake valve for opening/closing an intake port of the engine and an exhaust valve for opening/closing an exhaust port of the engine (see, for example, JP-A-2006-348853).

The turbocharger of the variable displacement type is a turbocharger that includes: a compressor arranged in an intake passage of the engine; a turbine arranged in an exhaust passage of the engine; and a variable nozzle for varying a turbine capacity and that supercharges an intake air to be suctioned into a combustion chamber of a cylinder of the engine by the use of the pressure of an exhaust gas (exhaust pressure) generated in the exhaust passage of the engine and sends a compressed air supercharged in this manner into the combustion chamber of the cylinder of the engine.

In the turbocharger of the variable displacement type, in the case where the variable nozzle is controlled so as to throttle a scroll passage for introducing an exhaust gas into a turbine, the flow rate of the exhaust gas to be introduced into the turbine is more limited to a smaller value, that is, a turbine capacity is decreased. On the other hand, when the scroll passage is throttled, the flow speed of the exhaust gas to be introduced into the turbine can be increased, so that even if an engine speed is in a low speed range, a specified intake pressure (actual supercharging pressure) can be obtained.

Further, in the turbocharger of the variable displacement type, when the variable nozzle opens the scroll passage, the turbine capacity is increased. In this way, in a high speed range in which the flow rate of the exhaust gas to be introduced into the turbine is large, by fully opening the scroll passage by the variable nozzle, a larger actual supercharging pressure can be obtained.

The variable-valve-timing controller is constructed in such a way as to vary a period (a valve overlap amount) in which the intake valve and the exhaust valve are opened at the same time.

When the valve overlap amount is sufficiently large at the time of accelerating the engine, the supercharging control device of the internal combustion engine controls the opening of the variable nozzle in such a way that an intake port pressure (an actual supercharging pressure) is higher than an exhaust port pressure (an exhaust back pressure, an exhaust pressure), thereby improving a retard in supercharging at the time of accelerating the engine.

When the valve overlap amount of the intake valve and the exhaust valve is set at a specified value corresponding to a driving state of the engine, there is caused a phenomenon such that fresh air (intake air) blows off to the exhaust passage from the intake passage via the combustion chamber of the cylinder of the engine. When the phenomenon such that the intake air blows off in this manner is caused, the gas remaining in the combustion chamber, the volume of which usually corresponds to at least the space volume of the combustion chamber, can be pushed out or scavenged by the use of fresh air from the intake passage, whereby the gas in the combustion chamber of the cylinder can be replaced by the fresh air (which is referred to as "a scavenging effect"). In this way, the effect of improving the torque of the engine can be produced.

However, in a supercharging control device of an internal combustion engine in the related art, at an early stage of acceleration of an engine, for the purpose of rapidly increasing an actual supercharging pressure, a turbine capacity is decreased by closing a variable nozzle and a turbine output is rapidly increased by a rapid increase in an exhaust pressure which is caused by the turbine capacity being decreased. In this way, the actual supercharging pressure can be rapidly increased. However, in the case where the magnitude of decrease in the turbine capacity is large, a pressure difference between the exhaust pressure and the actual supercharging pressure is made large.

However, the intake valve and the exhaust valve are made to overlap each other, so that in the case where the exhaust pressure is higher than the actual supercharging pressure, the amount of remaining gas which remains in the combustion chamber of the cylinder of the engine is increased by the effect of an exhaust interference. In this way, although the actual supercharging pressure is rapidly increased at the early stage of acceleration of the engine by the rapid increase in the exhaust pressure which is caused by the decrease in the turbine capacity, an increase in the amount of intake air to be suctioned into the combustion chamber of the cylinder of the engine is made gentle, which hence presents a problem that an increase in engine output, that is, an increase in torque of the engine will be made gentle.

SUMMARY

An objective of the present disclosure is to provide a supercharging control device of an internal combustion engine that can make an intake valve and an exhaust valve overlap each other on the condition that a scavenging effect is larger than the effect of an exhaust interference.

According to an aspect of the present disclosure, a supercharging control device has a first control device and a second control device.

The first control device performs a first control at the time of accelerating the internal combustion engine. In the first control, the turbine capacity is decreased to a value not more than a first target value lower than the turbine capacity before starting to accelerate the internal combustion engine or just before accelerating the internal combustion engine. Further, the valve overlap amount of the intake valve and the exhaust valve is decreased to a value not more than a first specified value smaller than the valve overlap amount before starting an acceleration of the internal combustion engine or just before accelerating the internal combustion engine.

The second control device performs a second control, after performing the first control, at a stage in which the intake pressure sensed by the intake pressure sensor or the exhaust pressure sensed by the exhaust pressure sensor is increased to a second pressure value higher than a first pressure value before starting to accelerate the internal combustion engine or just before accelerating the internal combustion engine. In the second control, the turbine capacity is increased to the turbine capacity which is set in correspondence to the driving state of the internal combustion engine and which is not less than a second target value higher than the first target value. The valve overlap amount is increased to a value not less than a second specified value larger than the first specified value.

In this way, at the early stage of acceleration of the internal combustion engine, the turbine output of the supercharger is rapidly increased by a rapid increase in the exhaust pressure of the internal combustion engine which is caused by decreasing the turbine capacity of the supercharger to a value not more than the first target value (TC1) (for example, to a minimum capacity). In this way, the rotation of a compressor is increased and hence the intake pressure of the internal combustion engine (actual supercharging pressure downstream of a compressor) is rapidly increased. At the same time, the valve overlap amount of the intake valve and the exhaust valve is decreased to a value not more than the first specified value (OL1) (for example, to a minimum value). An increase in the effect of an exhaust interference (an increase in the remaining gas), which is caused by the increase in the exhaust pressure of the internal combustion engine, can be restricted and the flow rate of air suctioned into the cylinder of the internal combustion engine can be increased (for example, maximized).

Then, when the internal combustion engine is further accelerated and is brought into a middle stage of acceleration or a later stage of acceleration or a last stage of acceleration and hence the intake pressure of the internal combustion engine is increased to the second pressure value to thereby establish a condition of capable of scavenging the exhaust gas, also a scavenging effect to be described below can be utilized. That is, by increasing the turbine capacity of the supercharger to a value not less than the second target value (TC2) to decrease the exhaust pressure of the internal combustion engine and to increase (maximize) the valve overlap amount of the intake valve and the exhaust valve to a value not less than the second specified value (OL2), the remaining gas in the cylinder of the internal combustion engine is pushed out or scavenged by the use of the fresh air from the intake passage, whereby the gas in the cylinder of the internal combustion engine can be replaced by the fresh air (scavenging effect).

Hence, on the condition that the scavenging effect is larger than the effect of the exhaust interference, the intake valve and the exhaust valve can be made to overlap each other.

In this regard, it is preferable that the second pressure value described above is set at the intake pressure of the internal combustion engine (an actual supercharging pressure, an intake manifold pressure) or the exhaust pressure of the internal combustion engine (the exhaust pressure, an exhaust manifold pressure) in which an estimated remaining gas amount is not more than a specified value. The estimated remaining gas amount is a remaining gas amount estimated at any time to remain in the cylinder of the internal combustion engine in the case where the turbine capacity of the supercharger is increased to a value not less than the second target value (TC2).

According to another aspect, a supercharging control device has a third control device performing a third control at a stage in which a specified time passes after starting the second control. In the third control, the turbine capacity is decreased to the turbine capacity which is set in correspondence to the driving state of the internal combustion engine and which is a third target value less than the second target value.

In this way, the intake pressure of the internal combustion engine is made higher than the exhaust pressure, which can realize the maximizing of an effect of decreasing the exhaust pressure of the internal combustion engine, which is produced by an increase in the turbine capacity of the supercharger, on the condition that the scavenging can be performed. The scavenging effect can be maximized.

In this regard, it is preferable that the second pressure value described above is set at the intake pressure of the internal combustion engine (an actual supercharging pressure, an intake manifold pressure) or the exhaust pressure of the internal combustion engine (the exhaust pressure, an exhaust manifold pressure) in which an estimated remaining gas amount is not more than a specified value. The estimated remaining gas amount is a remaining gas amount estimated at any time to remain in the cylinder of the internal combustion engine in a case where the turbine capacity of the supercharger is increased to a value not less than the second target value (TC2).

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
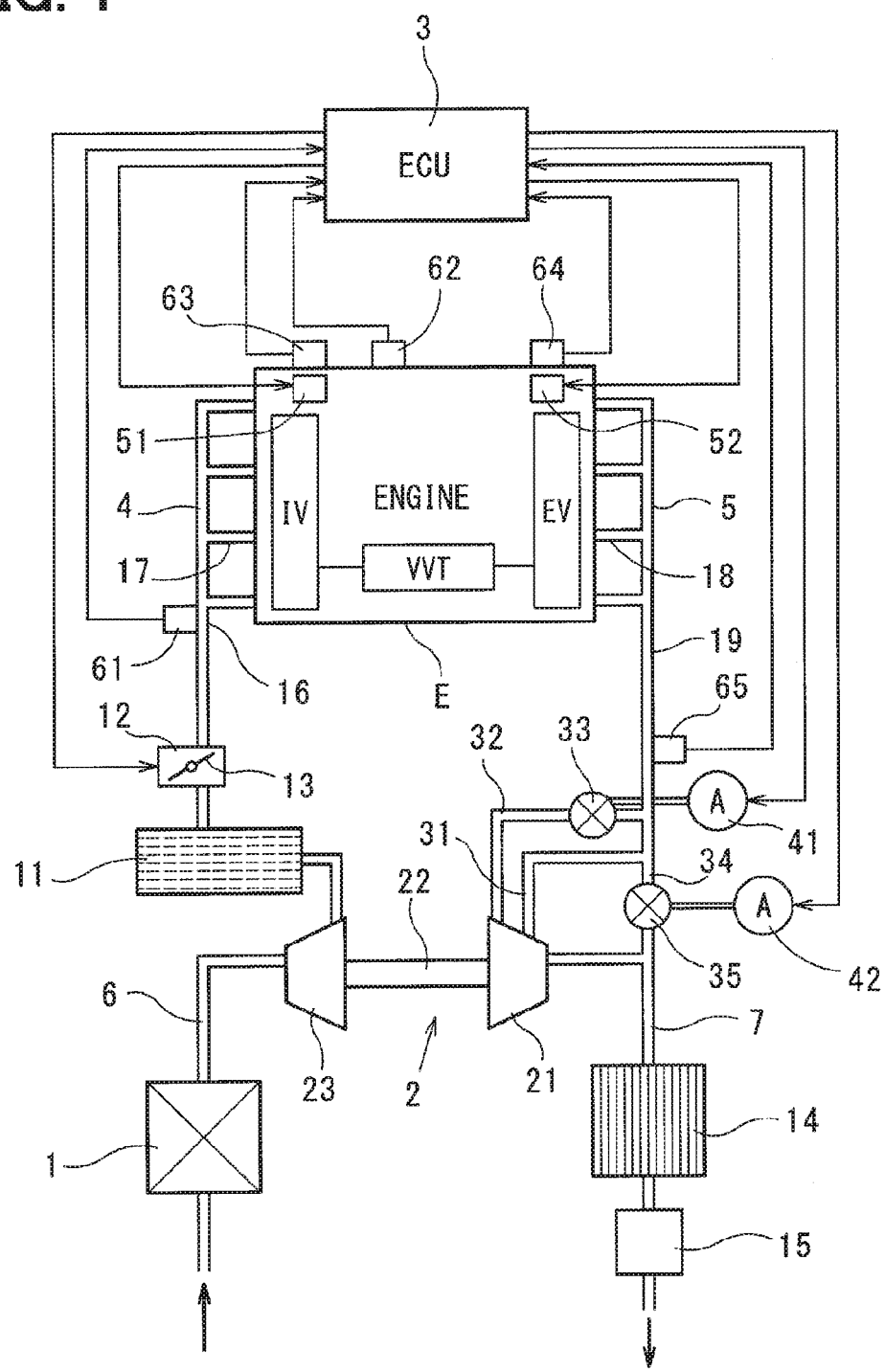
FIG. 1 is a schematic diagram to show a control device (engine control system) of an internal combustion engine provided with a turbocharger (first embodiment)

Hereinafter, the present disclosure will be described in detail on the basis of the accompanying drawings.

Embodiments

Construction of First Embodiment

FIG. 1 to FIG. 6 show a control device (first embodiment) of an internal combustion engine provided with a turbocharger to which a supercharging control device of an internal combustion engine according to the present disclosure is applied.

A control device of an internal combustion engine provided with a turbocharger of the present embodiment (hereinafter referred to as "an engine control system") includes: a turbocharger 2 of a variable displacement type (twin scroll type); a turbine capacity varying mechanism; a variable-valve-timing controller; and an engine control unit (an electronic control unit, hereinafter referred to as "ECU 3"). The turbocharger 2 supercharges (compresses) an intake air (a fresh air) passing through an air cleaner 1 by the use of the pressure of an emission gas (an exhaust gas) (an exhaust pressure of an internal combustion engine: hereinafter referred to as "an exhaust pressure") of an internal combustion engine (an engine E) for driving a vehicle, for example, an automobile. The turbine capacity varying mechanism can vary a turbine capacity of the turbocharger 2. The variable-valve-timing controller can vary an opening/closing characteristic of an intake valve (not shown in the drawing) of each cylinder of the engine E and an exhaust valve (not shown in the drawing) of each cylinder of the engine E. The engine control unit (ECU3) electrically controls an actuator of the turbine capacity varying mechanism and an actuator of the variable-valve-timing controller on the basis of a driving state (a condition) of the engine E. The control device of the internal combustion engine is used as a supercharging control device (a supercharging control device of the internal combustion engine) for controlling a turbine capacity of the turbocharger 2 and a valve overlap amount of the intake valve and the exhaust valve.

As the engine E is employed a multi-cylinder gasoline engine (in-line 4-cylinder engine) that has a plurality of cylinders (first cylinder #1 to fourth cylinder #4) and that generates an output by a thermal energy produced by combusting an air-fuel mixture in a combustion chamber, the air-fuel mixture being a mixture of clean air (fresh air) filtered with the air cleaner 1 and fuel injected from an injector (fuel injection valve). However, the engine E is not limited to the multi-cylinder gasoline engine but a multi-cylinder diesel engine may be applied to the engine E.

As the engine E is employed a 4-cycle engine that repeats four strokes of an intake stroke, a compression stroke, a combustion (explosion) stroke, and an exhaust stroke as a cycle.

An intake port of each of the cylinders #1 to #4 has an intake manifold 4 connected thereto. Further, an exhaust port of each of the cylinders #1 to #4 has an exhaust manifold 5 connected thereto.

The intake manifold 4 has an intake pipe 6 connected to an upstream end thereof, the intake pipe 6 having an intake passage formed therein. Further, the exhaust manifold 5 has an exhaust pipe 7 connected to a downstream end thereof, the exhaust pipe 7 having an exhaust passage formed therein.

The intake pipe 6 has the air cleaner 1, an intake compressor of the turbocharger 2, an intercooler 11, a throttle body 12, and a throttle valve 13 arranged therein. Further, the exhaust pipe 7 has an exhaust turbine of the turbocharger 2, an exhaust emission control system (catalyst) 14, and a muffler 15 arranged therein.

The intake manifold 4 includes a surge tank 16 and a plurality of intake branch pipes 17. The surge tank 16 reduces a pressure variation in the intake air (supercharged intake air) passing through the throttle body 12. The intake branch pipes 17 are arranged in parallel in a direction in which the cylinders are arranged.

The intake branch pipes 17 have a plurality of intake air branch passages formed therein, the intake air branch passages communicating with the intake ports of the respective cylinders #1 to #4. Further, these intake air branch passages are branched to the respective cylinders #1 to #4 at an intake air branch part (for example, surge tank 16) arranged on the upstream end of the intake manifold 4.

The exhaust manifold 5 includes: a plurality of exhaust branch pipes 18 arranged in parallel in the direction in which the cylinders are arranged; and an exhaust collection part 19 arranged on the downstream end of these exhaust branch pipes 18.

The exhaust branch pipes 18 have a plurality of exhaust branch passages formed therein, the exhaust branch passages communicating with the exhaust ports of the respective cylinders #1 to #4. Further, the exhaust manifold 5 has an exhaust collection part (exhaust collection part 19 arranged on the downstream end of the exhaust manifold 5) for collecting the exhaust gas emitted from the respective cylinder #1 to #4.

The engine E has: a cylinder block in which the cylinders are arranged in the direction in which the cylinders are arranged; and a cylinder head combined with the top portion of the cylinder block.

The cylinder block has four combustion chambers (cylinder bores) formed therein in the direction in which the cylinders are arranged. In each cylinder bore, a piston coupled to a crankshaft (an output shaft of the internal combustion engine) via a connecting rod is supported in such a way as to be freely slid in a direction in which the piston is slidably moved back and forth.

The cylinder head has at least one or more intake port independently connected to the combustion chamber of one cylinder. Each of the cylinders #1 to #4 has an intake valve (not shown) arranged on a combustion chamber side end of the intake port thereof. The intake valve opens/closes an intake port of each of the cylinders #1 to #4.

Further, the cylinder head has at least one or more exhaust port independently connected to the combustion chamber of one cylinder. Each of the cylinders #1 to #4 has an exhaust valve (not shown) arranged on a combustion chamber side end of the exhaust port thereof. The exhaust valve opens/closes an exhaust port of each of the cylinders #1 to #4.

The intake valve is constructed in such a way as to have its opening/closing operation controlled by an intake cam provided on an intake camshaft in correspondence to the intake valve of each cylinder. The intake camshaft is rotatably supported on the cylinder head.

On the other hand, the exhaust valve is constructed in such a way as to have its opening/closing operation controlled by an exhaust cam provided on an exhaust camshaft in correspondence to the exhaust valve of each cylinder. the exhaust camshaft is rotatably supported on the cylinder head.

The intake camshaft and the exhaust camshaft are rotated in a specified direction in synchronization with the crankshaft of the engine E. The intake camshaft and the exhaust camshaft are coupled to and driven by the crankshaft in such a way to be rotated once when the crankshaft is rotated twice.

Further, the cylinder head are fixed with: a plurality of spark plugs for igniting the air-fuel mixture flowing into the combustion chambers of the respective cylinders #1 to #4; and a plurality of injectors (fuel injection valves of a port injection type) for injecting fuel into the intake ports of the respective cylinders #1 to #4. In this regard, in the case of an injector (fuel injection valve) of a cylinder direct injection type, the fuel is injected to the intake air flowing into the combustion chamber of each of the cylinders #1 to #4.

The intercooler 11 is a cooling heat exchanger that exchanges heat between a supercharged intake air (supercharged air, compressed air) supercharged by the intake compressor of the turbocharger and a cooling water (or cooling air) of a cooling medium to thereby cool the supercharged air. An exit end of the intercooler 11 is connected to the throttle body 12 of an electronic throttle via the intake pipe 6.

The electronic throttle includes the throttle body 12, the throttle valve 13, an electric actuator (not shown), and a throttle opening sensor (not shown). The throttle body 12 constructs a portion of the intake pipe 6. The throttle valve 13 is rotatably received in the throttle body 12 and adjusts (meters) the flow rate of the intake air introduced into the each cylinder of the engine E from the intake compressor. The electric actuator (not shown) opens/closes the throttle valve 13. The throttle opening sensor outputs a signal corresponding to the opening (throttle opening) of the throttle valve 13 to the ECU 3.

In this regard, the electric actuator is constructed of a throttle motor (electric motor) and a speed reduction mechanism. The throttle motor generates a power (torque) for rotating and driving the throttle valve 13 when supplied with electricity. The speed reduction mechanism reduces the rotation of an output shaft of the throttle motor and transmits the reduced rotation to a rotating shaft of the throttle valve 13.

The turbocharger 2 includes an intake compressor and an exhaust turbine. The intake compressor is arranged in the middle of the intake pipe 6 for letting the intake air flow from the air cleaner 1 to the throttle body 12 and the surge tank 16 of the intake manifold 4. The exhaust turbine is arranged in the middle of the exhaust pipe 7 for letting the exhaust gas flow from the exhaust collection part 19 of the exhaust manifold 5 to a catalyst 14.

The turbocharger 2 has a turbine impeller 21 which is rotated and driven by the exhaust gas. The turbocharger 2 also has a turbine shaft 22 and a compressor impeller 23 which are coupled to the turbine impeller 21 in such a way as to be rotated along with. The compressor impeller 23 compresses the intake air and introduced the compressed intake air into the respective cylinders of the engine E.

The exhaust turbine includes the turbine impeller 21 and a turbine housing (hereinafter referred to as "a housing"). The turbine impeller 21 has a plurality of turbine blades in a circumferential direction and is rotated and driven by the exhaust pressure of the engine E. The turbine impeller 21 is coupled directly to the compressor impeller 23 via the turbine shaft 22 and rotates and drives (directly drives) the compressor impeller 23.

The intake compressor includes the compressor impeller 23 and a compressor housing (hereinafter referred to as "a housing"). The compressor impeller 23 has a plurality of compressor blades in a circumferential direction and is coupled to the turbine impeller 21 via the turbine shaft 22 in such a way as to be rotated along with, thereby being rotated and driven by the turbine impeller 21.

The housing of the exhaust turbine has a shroud wall arranged in such a way as to surround the periphery of the turbine impeller 21. The housing has an impeller receiving space formed in the center portion thereof, the impeller receiving space receiving the turbine impeller 21 in such a way that the turbine impeller 21 can rotate.

A scroll passage (exhaust gas introduction passage) and the impeller receiving space are provided upstream of the turbine impeller 21 in such a way as to spirally surround the turbine impeller 21 and the impeller receiving space.

An upstream end of the scroll passage is connected to the exhaust collection part 19 of the exhaust manifold 5 via the exhaust pipe 7.

The housing of the exhaust turbine has dividing parts (partitioning parts) such as dividing walls formed therein. The dividing parts divides a scroll passage into a first scroll passage 31 and a second scroll passage 32 each of which communicates with the impeller receiving space. Further, the housing is mounted with a flow rate adjustment valve (scroll valve) 33 for controlling the flow rate of the exhaust gas flowing through the first scroll passage 31 by an opening/closing action.

The flow rate adjustment valve 33 is a valve body (valve main body) of a first exhaust flow rate control valve for adjusting (metering) the flow rate of the exhaust gas introduced into the turbine impeller 21 and the impeller receiving space via the second scroll passage 32 of at least one of the two of the first scroll passage 31 and the second scroll passage 32.

The turbine capacity varying mechanism includes a housing, the flow rate adjustment valve 33, an electric actuator 41, and a first valve opening sensor (not shown). The housing constructs a part of the exhaust pipe 7. The flow rate adjustment valve 33 is received in the housing in such a way as to be rotated and changes a turbine capacity of the turbocharger 2. The electric actuator 41 opens/closes the flow rate adjustment valve 33. The first valve opening sensor outputs a signal corresponding to the opening (first valve opening) of the flow rate adjustment valve 33 to the ECU 33.

The electric actuator 41 is constructed of: an electric motor for generating a power (torque) for opening/closing the flow rate adjustment valve 33 when supplied with the electricity; and a speed reduction mechanism for reducing the rotation of an output shaft of the electric motor and for transmitting the rotation to a rotary shaft of the throttle valve 13.

Here, an electric motor of a power source of the electric actuator 41 is electrically connected to an external power source (battery) mounted in a vehicle such as an automobile via a motor drive circuit electronically controlled by the ECU 3.

Further, the housing of the exhaust turbine is provided with an exhaust bypass passage (waste gate passage) 34 that makes the exhaust gas flowing from the exhaust collection part 19 of the exhaust manifold 5 bypass the turbine impeller 21 and the impeller receiving space to thereby introduce the exhaust gas into the exhaust passage downstream of the turbine impeller 21 and the impeller receiving space. Still further, the housing is mounted with a waste gate valve 35 for controlling the flow rate of the exhaust gas flowing through the exhaust bypass passage 34 by an opening/closing action. The waste gate valve 35 is a valve body (valve main body) of a second exhaust flow rate control valve that is opened when the intake pressure (actual supercharging pressure) of the engine 1 is more than a set value to thereby reduce a turbine capacity to a minimum value (to reduce the actual supercharging pressure of the intake compressor to a value not more than the set value).

The turbine capacity varying mechanism includes: a housing; the waste gate valve 35; an electric actuator 42; and a second valve opening sensor (not shown). The housing constructs a part of the exhaust pipe 7. The waste gate valve 35 is received in the housing in such a way as to be rotated and changes the turbine capacity of the turbocharger 2. The electric actuator 42 opens/closes the waste gate valve 35. The second valve opening sensor outputs a signal corresponding to the opening (second valve opening) of the waste gate valve 35 to the ECU 3.

The electric actuator 42 is constructed of an electric motor and a speed reduction mechanism. The electric motor generates a power (torque) for opening/closing the waste gate valve 35 when supplied with the electricity. The speed reduction mechanism reduces the rotation of an output shaft of the electric motor and transmits the rotation to a rotary shaft of the waste gate valve 35.

Here, the electric motor of a power source of the electric actuator 42 is electrically connected to a battery mounted in a vehicle such as an automobile via a motor drive circuit electronically controlled by the ECU 3.

The variable-valve-timing controller of the present embodiment is constructed of: an intake-valve-timing controller (hereinafter referred to as "an intake VVT"); an intake hydraulic circuit; an exhaust-valve-timing controller (hereinafter referred to as "an exhaust VVT"); an exhaust hydraulic circuit; an intake oil control valve (hereinafter referred to as "an intake OCV) 51; an exhaust oil control valve (hereinafter referred to as "an exhaust OCV) 52; and the ECU 3. The intake VVT can vary an opening/closing timing (a valve timing) of the intake valve of each cylinder. The intake hydraulic circuit hydraulically controls an action of the intake VVT. The exhaust VVT can vary an opening/closing timing (a valve timing) of the exhaust valve of each cylinder. The exhaust hydraulic circuit hydraulically controls an action of the exhaust VVT. The intake oil control valve (the intake OCV) 51 is provided in the intake hydraulic circuit. The exhaust oil control valve (the exhaust OCV) 52 is provided in the exhaust hydraulic circuit. The ECU 3 electrically controls the intake OCV 51 and the exhaust OCV 52.

The intake VVT is fixed on the intake camshaft of the engine and capable of continuously varying the valve timing of the intake valve.

The exhaust VVT is fixed on the exhaust camshaft of the engine and capable of continuously varying the valve timing of the exhaust valve.

The intake VVT (or the exhaust VVT) includes a shoe housing having a depressed portion formed on an inner circumferential side thereof and a vane rotor having vanes for partitioning the depressed portion of the shoe housing into a first pressure chamber and a second pressure chamber (an advance chamber and a retard chamber). The intake VVT (or the exhaust VVT) controls the pressure of oil (hereinafter referred to as "hydraulic pressure") to be supplied to the advance chamber and the retard chamber by the intake OCV 51 (or the exhaust OCV 52) in a state where the shoe housing is coupled to a timing belt to thereby shift a rotation phase between the crankshaft of the engine E and the intake camshaft (or the exhaust camshaft), thereby vary the valve timing of the intake valve (or the exhaust valve) continuously or in a stepwise manner.

The intake OCV 51 (or the exhaust OCV 52) is an electromagnetic hydraulic control valve including a spool valve and an electromagnetic actuator (a linear solenoid). The spool valve is provided in the shoe housing of the intake VVT (or the exhaust VVT) and switches an oil passage for a hydraulic control to the advance chamber and the retard chamber. The electromagnetic actuator (the solenoid) drives a spool of the spool valve in an axial direction. The spool valve and the linear solenoid of the intake OCV 51 (or the exhaust OCV 52) are coupled to each other in the axial direction.

The spool valve includes: a cylindrical sleeve coupled to the linear solenoid and extended in the axial direction toward a tip end from a base end; and a spool supported in an inner bore of the sleeve in such a way as to be slidably moved back and forth. The sleeve has a return spring received on the tip end of an inner bore thereof. The return spring biases the spool toward the base end in the axial direction.

The spool valve has an advance drain port, an advance output port, an input port, a retard output port, and a retard drain port formed therein in this order from the tip end of the sleeve to the base end at specified distances in the axial direction of the sleeve (at specified axial distances). The advance drain port emits the oil from the inside of the inner bore. The advance output port outputs the oil toward the advance chamber from the inside of the inner bore. The input port has the oil supplied therethrough to the inside of the inner bore from the oil pump. The retard output port outputs the oil toward the retard chamber from the inside of the inner bore. The retard drain port emits the oil from the inside of the inner bore.

The electromagnetic actuator includes a solenoid coil for driving the spool toward the tip end in the axial direction when supplied with the electricity.

The solenoid coil of the electromagnetic actuator is electrically connected to a battery mounted in the vehicle such as the automobile via an electromagnetic valve drive circuit electronically controlled by the ECU 3.

Here, each of the electric actuator (the electric motor) of the electronic throttle, the electric actuator (the electric motor) 41 of the flow rate adjustment valve 33, the electric actuator (the electric motor) 42 of the waste gate valve 35, the electromagnetic actuator (the solenoid coil) of the intake OCV 51, and the electromagnetic actuator (the solenoid coil) of the exhaust OCV 52 is constructed in such a way that current passing through each of them is controlled by the ECU 3.

The ECU 3 is provided with a microcomputer of a well-known structure constructed in such a way as to include the functions of a CPU, a memory (a ROM, a RAM, and an EEPROM), an input circuit (an input device), an output circuit (an output device), an electric power circuit, and a timer circuit.

In this regard, the ECU 3 corresponds to "a first control device", "a second control device", "a third control device", and "an operation device".

The CPU performs various numerical operation processing, information processing and controls (for example, a first control, a second control, or first to third controls) by programs.

In the ROM are previously stored programs necessary for the CPU to perform the various numerical operation processing, information processing and controls. Further, in the ROM is stored information necessary for the CPU to perform the numerical operation processing, information processing and controls.

In the RAM is temporarily stored intermediate information produced by the operation processing performed by the CPU. When an ignition switch (an engine switch) is turned off, the stored information is deleted.

In the EEPROM is stored information necessary for the CPU to perform the various numerical operation processing, information processing and controls.

In the ROM or the EEPROM are previously stored the data of at least four three-dimensional maps (see FIG. 4 to FIG. 6) and the like.

An estimated value (estimated remaining gas) of a ratio of remaining gas remaining in the combustion chamber of each cylinder of the engine E, which is used at the time of determining a specified supercharging pressure PS2, can be calculated by the use of the three-dimensional map (see FIG. 4) or an operation expression, which is made by measuring a relationship between a surge tank pressure of an intake port pressure (an intake manifold pressure) (or an intake air amount) and an engine rotation speed (hereinafter referred to as "an engine speed: NE") in advance by an experiment.

Further, a specified value (a specified value of the estimated remaining gas) of a ratio of remaining gas remaining in the combustion chamber of each cylinder of the engine E, which is used at the time of determining the specified supercharging pressure PS2, can be calculated by the use of the three-dimensional map (see FIG. 5) or an operation expression, which is made by measuring a relationship between the surge tank pressure (or the intake air amount) and the engine speed (NE) in advance by an experiment or the like.

Further, a change speed of the turbine capacity at the time of determining whether or not the engine E is accelerated can be calculated by the use of the three-dimensional map (see FIG. 6A) or an operation expression, which is made by measuring a relationship between the surge tank pressure (or the intake air pressure) and the engine speed (NE) in advance by an experiment or the like.

Still further, a change speed of the valve overlap amount at the time of determining whether or not the engine E is accelerated can be calculated by the use of the three-dimensional map (see FIG. 6B) or an operation expression, which is made by measuring a relationship between the surge tank pressure (or the intake air pressure) and the engine speed (NE) in advance by an experiment or the like.

Sensor output signals (analog voltage signals) to be described below and sensor output signals (electric signals) to be described below are A/D converted by an A/D conversion circuit at a specified sampling cycle (for example, at a cycle of 30° CA) and then are inputted to the input device of the microcomputer. The sensor output signals (analog voltage signals) are transmitted from a surge tank pressure (an intake port pressure) sensor 61. Also, the sensor output signals are transmitted from an exhaust port pressure sensor (not shown). The sensor output signals (electric signals) are transmitted from various kinds of sensors, such as, a crank angle sensor 62; an intake cam angle sensor 63; an exhaust cam angle sensor 64; an exhaust gas temperature sensor 65; an air flow meter; an accelerator position sensor; a throttle opening sensor; an intake air temperature sensor; a water temperature sensor; an exhaust gas sensor (an air-fuel ratio sensor, an oxygen concentration sensor); and a vehicle speed sensor.

To the input device of the microcomputer are connected not only the surge tank pressure sensor 61 and the exhaust port pressure sensor but also the crank angle sensor 62, the intake cam angle sensor 63, the exhaust cam angle sensor 64, the exhaust gas temperature sensor 65, the air flow meter, the accelerator position sensor, the throttle opening sensor, the intake air temperature sensor, the water temperature sensor, the exhaust gas sensor (the air-fuel ratio sensor, the oxygen concentration sensor), and the vehicle speed sensor. A traveling state detection device of the vehicle is constructed of the vehicle speed sensor. The vehicle speed sensor senses a traveling speed of the vehicle.

In this regard, a driving state detection device for detecting the driving state of the engine E (an engine driving situation, an engine driving condition) is constructed not only of the surge tank pressure sensor 61 and the exhaust port pressure sensor but also of the various kinds of sensors such as the crank angle sensor 62, the intake cam angle sensor 63, the exhaust cam angle sensor 64, the exhaust gas temperature sensor 65, the air flow meter, the accelerator position sensor, the throttle opening sensor, the intake air temperature sensor, the water temperature sensor, and the exhaust gas sensor (the air-fuel ratio sensor, the oxygen concentration sensor).

The surge tank pressure sensor 61 corresponds to "an intake pressure sensor" and is an intake pressure sensing device for converting the surge tank pressure of the intake pressure of the engine E (actual supercharging pressure of the intake pressure downstream of the intake compressor) into an electric signal and for outputting the electric signal to the ECU 3 as a pressure sensing value (for example, the intake manifold pressure: PIN1, PIN2).

The exhaust port pressure sensor corresponds to "an exhaust pressure sensor" and is an exhaust pressure sensing device for converting the exhaust port pressure of the exhaust pressure of the engine E (the exhaust pressure upstream of the exhaust compressor) into an electric signal and for outputting the electric signal to the ECU 3 as a pressure sensing value (for example, the exhaust manifold pressure: PEX1, PEX 2).

The crank angle sensor 62 has a pickup coil for converting a rotation angle (crank angle) of the crankshaft of the engine E into an electric signal and outputs an NE pulse signal to the ECU 3, for example, at intervals of 15° or 30° CA (crank angle). The crank angle sensor 62 outputs an electric signal (a sensor output signal) corresponding to the rotation angle (the crank angle) of the crankshaft of the engine E to the ECU 3.

The ECU 3 has a function as a rotation speed detection device for detecting the engine speed (NE) by measuring an interval time of the NE pulse signal of an output signal of the crank angle sensor 62.

The intake cam angle sensor 63 outputs an electric signal (a sensor output signal) to the ECU 3. The electric signal (the sensor output signal) corresponds to the rotation angle (intake cam angle) of the intake camshaft having cam noses (intake cams) which determine a valve timing of the intake valve and the number of which is equal to the number of cylinders.

The exhaust cam angle sensor 64 outputs an electric signal (a sensor output signal) to the ECU 3. The electric signal corresponds to the rotation angle (exhaust cam angle) of the exhaust camshaft having cam noses (exhaust cams)

which determine a valve timing of the exhaust valve and the number of which is equal to the number of cylinders.

The exhaust gas temperature sensor 65, the intake air temperature sensor, and the water temperature sensor output electric signals (sensor output signals) corresponding to an exhaust gas temperature, an intake air temperature, and a cooling water temperature, respectively, to the ECU 3.

The air flow meter outputs an electric signal (a sensor output signal) to the ECU 3. The electric signal corresponds to the flow rate of the intake air flowing through the intake passage in the intake pipe 6, in particular, the flow rate of fresh air (intake air) passing through the air cleaner 1 (the intake air amount).

The accelerator position sensor outputs an electric signal (a sensor output signal) to the ECU 3. The electric signal corresponds to a stepped amount of an accelerator pedal (an accelerator opening: ACCP). In this regard, in the case where a throttle opening sensor is mounted, the throttle opening sensor may be used as the engine load sensor.

Figure 2:
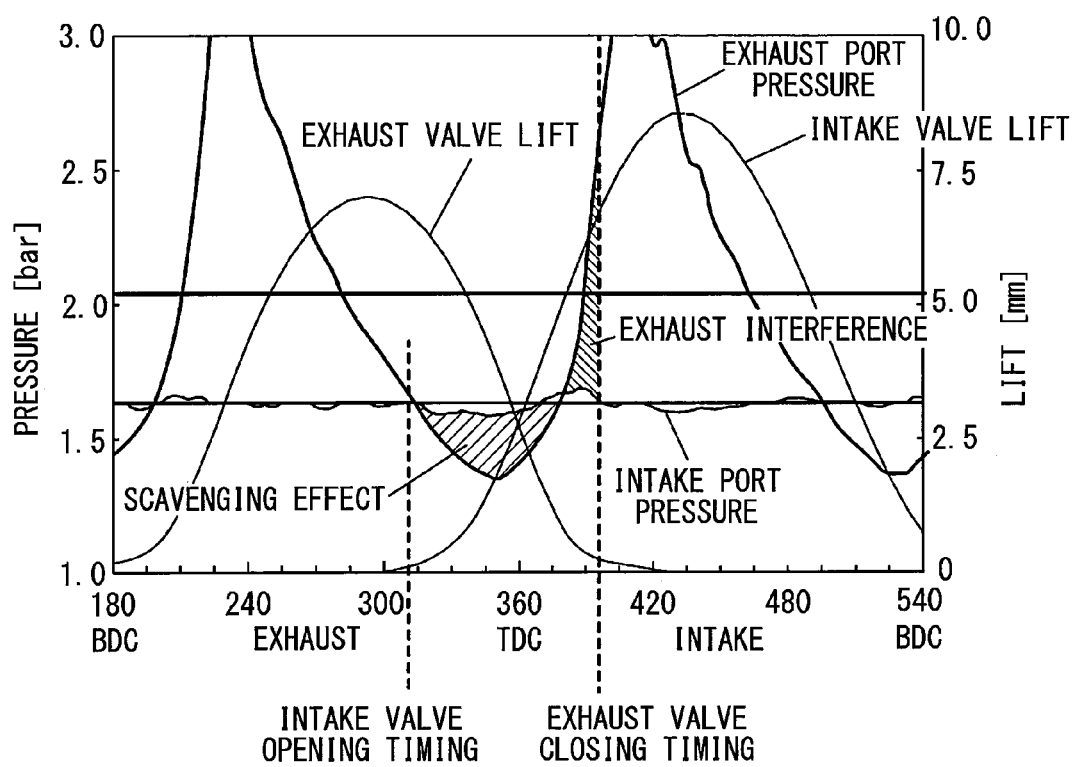
FIG. 2 is a graph to show a mechanism of scavenging (first embodiment)

FIG. 2 is a graph showing an exhaust valve lift and an intake valve lift correspond to an exhaust port pressure and an intake port pressure at the time of an exhaust stroke (EXHAUST) and at the time of an intake stroke (INTAKE) of a certain cylinder among the cylinders #1 to #4.

In the exhaust stroke of each of the cylinders #1 to #4, the exhaust valve is opened at a bottom dead center (BDC) or before or after the BDC and the exhaust valve is closed at a top dead center (TDC) or before or after the TDC.

Further, in the intake stroke of each of the cylinders #1 to #4, the intake valve is opened at the top dead center (TDC) or before or after the TDC and the intake valve is closed at the bottom dead center (BDC) or before or after the BDC.

Further, in the present embodiment, there is provided an overlap period (the valve overlap amount) in which a valve opening period of the intake valve of each of the cylinders #1 to #4 overlaps a valve opening period of the exhaust valve of each of the cylinders #1 to #4.

In the case where the valve overlap amount is changed, in the cylinder (the exhaust cylinder) in the exhaust stroke (EXHAUST), electric current passing through the intake OCV 51 is controlled. In this way, a driving mode of the intake VVT is set at an intake advance mode for outputting oil toward the advance chamber of the shoe housing of the intake VVT and for emitting the oil from the retard chamber to thereby advance the valve opening timing and the valve closing timing of the intake valve. In this way, a valve opening period of the intake valve and a valve opening period of the exhaust valve are made to overlap each other.

Alternatively, in the cylinder (the exhaust cylinder) in the exhaust stroke (EXHAUST), the electric current passing through the intake OCV 51 of the intake VVT is controlled and the electric current passing through the exhaust OCV 52 of the exhaust VVT is controlled. In this way, the driving mode of the intake VVT is set at the intake advance mode for outputting the oil toward the advance chamber of the shoe housing of the intake WT and for emitting the oil from the retard chamber, whereby the valve opening timing and the valve closing timing of the intake valve are advanced. On the other hand, the driving mode of the exhaust VVT is set at an exhaust retard mode for outputting the oil toward the retard chamber of the shoe housing of the exhaust WT and for emitting the oil from the advance chamber, whereby the valve opening timing and the valve closing timing of the exhaust valve are retarded. In this way, the valve opening timing of the intake valve and the valve opening timing of the exhaust valve are made to overlap each other.

Figure 3:
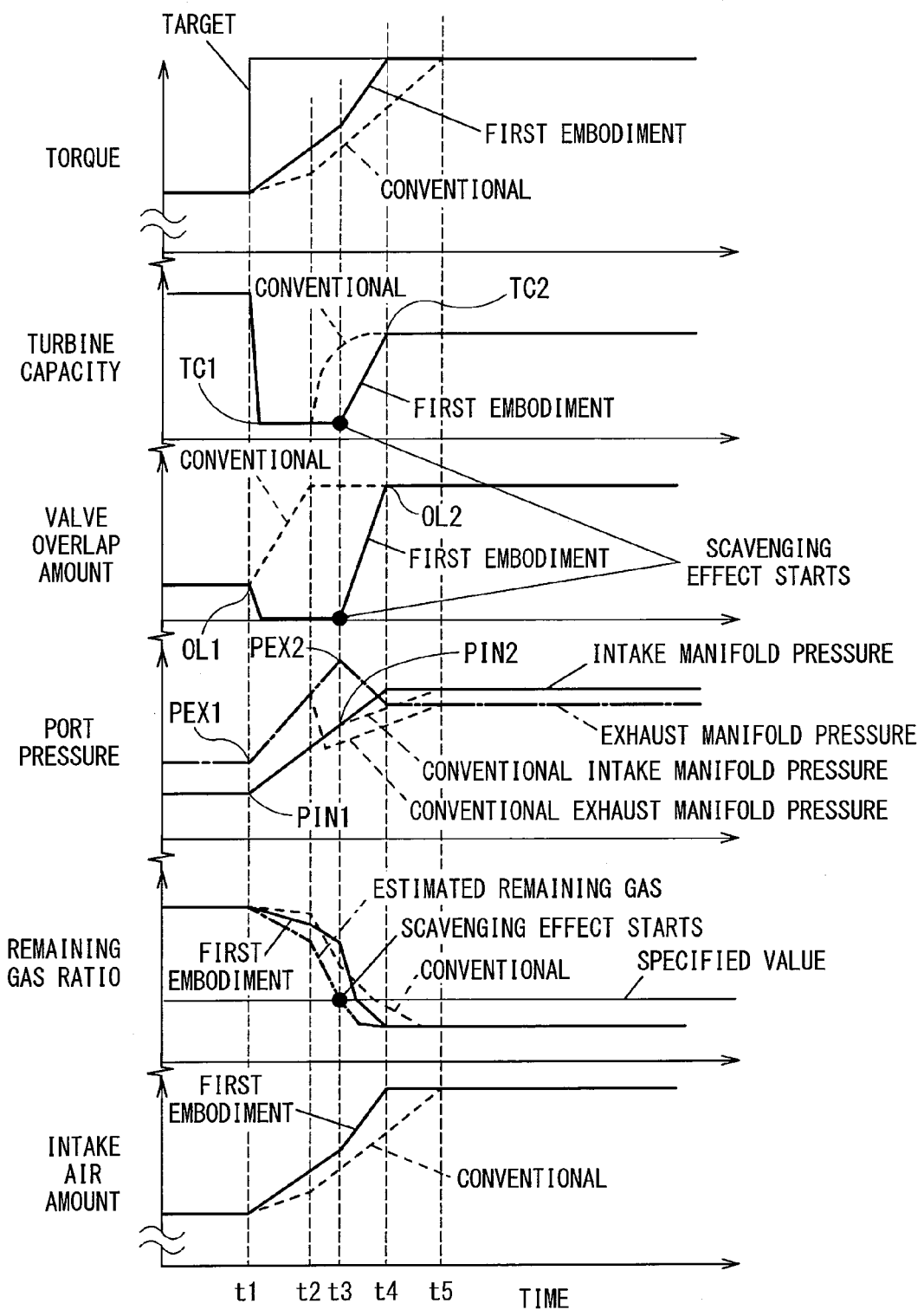
FIG. 3 is a timing chart to show changes in: the torque; the turbine capacity; the valve overlap amount; the port pressure; the remaining gas ratio; and the intake air amount of an engine (first embodiment)
Figure 4:
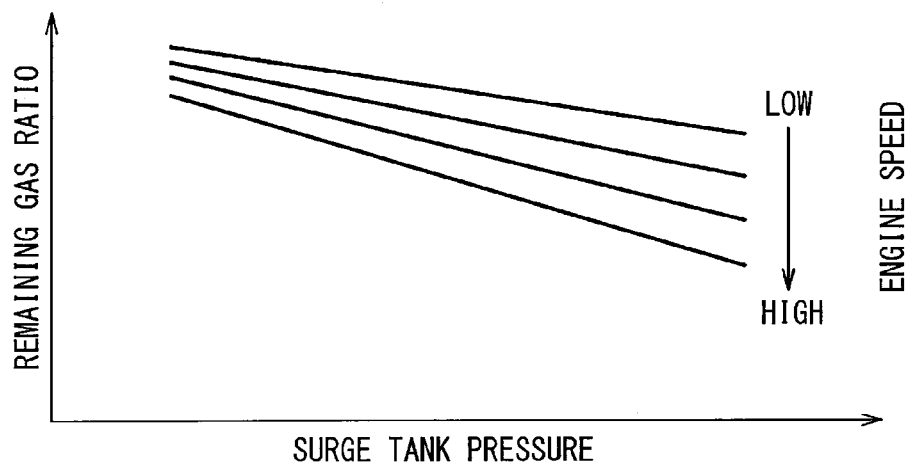
FIG. 4 is a three-dimensional map (characteristic diagram) to show a relationship among a remaining gas ratio, a surge tank pressure or an intake air amount, and an engine speed (first embodiment)
Figure 5:
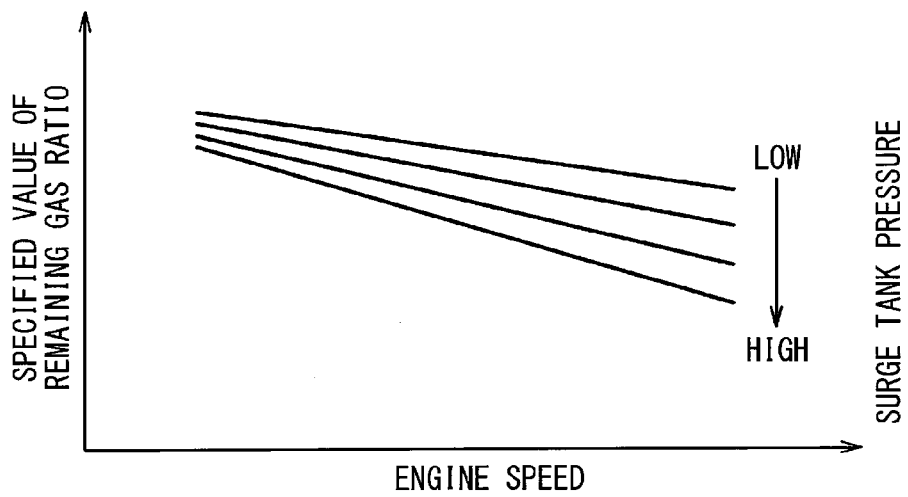
FIG. 5 is a three-dimensional map (characteristic diagram) to show a relationship among a specified value of a remaining gas ratio, an engine speed, and a surge tank pressure or an intake air amount (first embodiment)
Figure 6A:
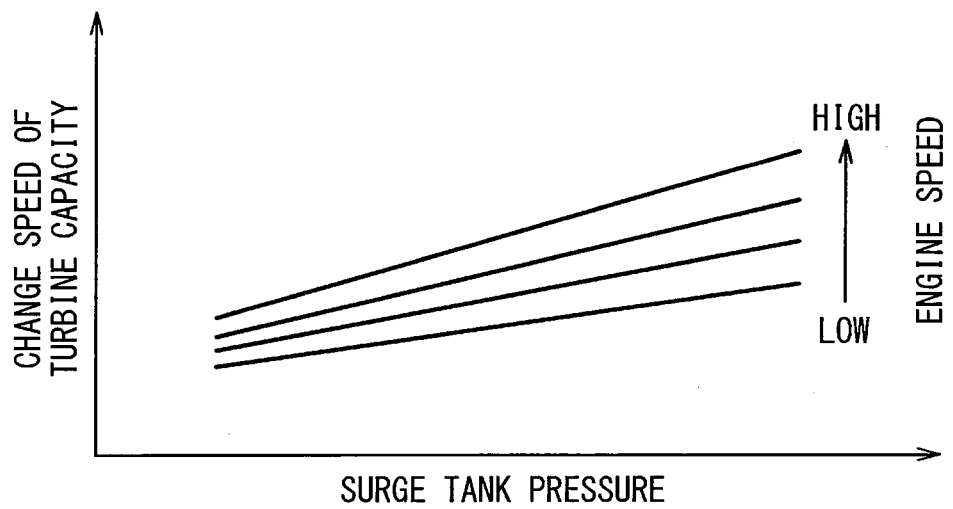
FIG. 6A is a three-dimensional map (characteristic diagram) to show a relationship among a change speed of a turbine capacity, a surge tank pressure or an intake air amount, and an engine speed (first embodiment)
Figure 6B:
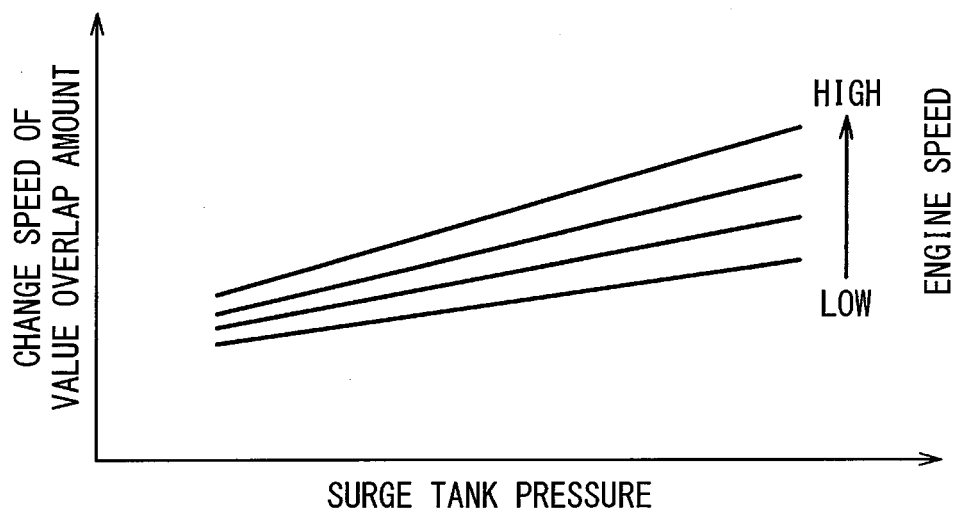
FIG. 6B is a three-dimensional map (characteristic diagram) to show a relationship among a change speed of a valve overlap amount, a surge tank pressure or an intake air amount, and an engine speed (first embodiment)

Further, in the case where the turbine capacity of the turbocharger 2, as shown in FIG. 3, is decreased from the turbine capacity when the rotation speed of the engine E is a specified constant speed (when the engine E is rotated at a constant speed) to a value not more than a first target value (TC1) (for example, to a minimum capacity), the driving mode of the turbocharger 2 is set at a minimum capacity mode for controlling the current passing through the electric actuator 41 to close (totally close) the flow rate adjustment valve 33 to thereby close the second scroll passage 32.

In this way, the total exhaust gas passes through the first scroll passage 31 and is introduced into the turbine impeller 21 and the impeller receiving space of the exhaust turbine, so that the flow rate of the exhaust gas introduced into the turbine impeller 21 is decreased. However, the flow speed of the exhaust gas introduced into the turbine impeller 21 is increased and hence an exhaust energy (the exhaust manifold pressure, the exhaust pressure in the first embodiment) applied to the turbine impeller 21 is increased. Hence, the rotation of the turbine impeller 21 is increased and hence the actual supercharging pressure of the intake compressor is increased, so that the torque of the engine E is increased to a target value of the torque of the engine E.

Further, in the case where the turbine capacity of the turbocharger 2 is increased to a value not less than a second target value (TC2) which is a turbine capacity set in correspondence to a target supercharging pressure and the engine speed, the driving mode of the turbocharger 2 is set at a second capacity varying mode for controlling electric current passing through the electric actuator 41 so as to control the opening of the flow rate adjustment valve 33. The second scroll passage 32 is partially opened.

Still further, in the case where the turbine capacity of the turbocharger 2 is decreased to a value not more than a third target value (TC3) which is a turbine capacity set in correspondence to the target supercharging pressure and the engine speed, the driving mode of the turbocharger 2 is set at a third capacity varying mode for controlling electric current passing through the electric actuator 41 to control the opening of the flow rate adjustment valve 33. The second scroll passage 32 is partially opened.

Still further, in the case where a deviation between the actual supercharging pressure and the target supercharging pressure is not more than a first determination value determined in advance, the driving mode of the turbocharger 2 can also be set at a maximum capacity mode for controlling current passing through the electric actuator 41 to thereby open (fully open) the flow rate adjustment valve 33 and for opening the exhaust bypass passage 34.

Further, in the case where the engine E is driven at high speeds, in other words, in the case where the engine speed is in a high speed rotation range, for example, not less than 2500 rpm, or in the case where the actual supercharging pressure is made more than a target supercharging pressure by a value not less than a second determination value determined in advance, the driving mode of the turbocharger 2 is set at a bypass mode for controlling current passing through the electric actuator 42 to open the waste gate valve 35 to thereby open the exhaust bypass passage 34.

In this way, a part of the exhaust gas bypasses the turbine impeller 21 and the impeller receiving space of the exhaust turbine and hence the flow rate of the exhaust gas introduced into the turbine impeller 21 is decreased, so that the exhaust energy applied to the turbine impeller 21 (the exhaust manifold pressure, the exhaust pressure of the first embodiment) is decreased. Hence, the excessive rotation of the turbine impeller 21 is inhibited and the actual supercharging pressure of the intake compressor is suppressed to a value not more than a set value.

Control Method of First Embodiment

Next, a control method of a control system of the present embodiment will be simply described on the basis of FIG. 1 to FIG. 6.

When an ignition switch is turned on, the ECU 3 receives various kinds of sensor output signals. The sensor output signals are necessary for calculating the driving state of the engine E. This processing is repeatedly performed at specified sampling intervals.

Specifically, the ECU 3 reads the crank angle, the intake cam angle, the exhaust cam angle, the engine speed (NE), the accelerator opening, the throttle opening, a command injection amount, the surge tank pressure (the actual supercharging pressure), the exhaust port pressure, the intake air temperature, the exhaust gas temperature, and the water temperature. The engine speed (NE) is detected (measured) by measuring an interval time of the NE pulse signal outputted from the crank angle sensor 62. Further, the command injection amount is calculated by adding a correction amount taking into account the water temperature and the like to a base injection amount set in correspondence to the engine speed (NE) and the accelerator opening.

Further, the igniting order of the respective cylinders #1 to #4 of the engine E or the order of fuel injection from the injector is the first cylinder #1→the third cylinder #3→the fourth cylinder #4→the second cylinder #2, and the intake stroke and the exhaust stroke are performed in this order.

Further, in each of the cylinders #1 to #4, the fuel injection is started by opening the injector set in correspondence to each of the cylinders #1 to #4 at a timing shifted by 180° CA, for example, near the top dead center (TDC) in the compression stroke of each of the cylinders #1 to #4.

First, this time value (ACCP(n)) of the accelerator opening is transmitted from the output signal of the accelerator position sensor. Next, the last time value (ACCP(n−1)) of the accelerator opening stored in the memory (the RAM or the EEPROM) are transmitted. A deviation (ΔACCP) between the this time value (ACCP(n)) and the last time value (ACCP(n−1)) of the accelerator opening is obtained. Alternatively, an accelerator opening change rate is calculated from the output signal of the accelerator position sensor. The accelerator opening change rate is obtained from an amount of change per unit time of the accelerator opening (an amount of change in the accelerator opening) sensed by the accelerator position sensor.

Next, for the purpose of determining whether or not a request of accelerating the engine E is made by a driver, it is determined whether or not the driver starts to step an accelerator pedal. Specifically, it is determined whether or not the deviation (ΔACCP) between this time value (ACCP(n)) and the last time value (ACCP(n−1)) of the accelerator opening is not less than an acceleration determination value set in advance. Alternatively, it is determined whether or not the accelerator opening change rate is not less than another acceleration determination value set in advance (an acceleration request determination device).

Next, in the case where the request of accelerating the engine E is made by the driver, the target supercharging pressure is calculated from the engine speed (NE) and the command injection amount or the accelerator opening (a supercharging pressure determination device).

This target supercharging pressure may be read from a three-dimensional map made by measuring a relationship between the engine speed (NE) and the command injection amount or the accelerator opening in advance by an experiment or the like.

Then, the ECU 3 performs a first control to be described below in the manner shown by timing charts in FIG. 3 at the beginning of acceleration (a timing t1) when a state in which the engine E is driven at a constant speed is shifted to a state in which the engine E is accelerated. In the first control, an actuator of the turbine capacity varying mechanism is electrically controlled in such a way that the turbine capacity of the turbocharger 2 is reduced to, for example, a value not more than the first target value (TC1) of a minimum capacity corresponding to a minimum value of the valve overlap amount of the intake valve and the exhaust valve. Further, in the first control, an actuator of the intake WT or the exhaust VVT of the variable-valve-timing controller is electrically controlled in such a way that the valve overlap amount is reduced to, for example, a first specified value (OL1) corresponding to a minimum value of the valve overlap amount (the first control device).

In this regard, the first target value (TC1) of the turbine capacity and the first specified value (OL1) of the valve overlap amount are stored in the ROM and the EEPROM in advance.

First, in the case where the turbine capacity of the turbocharger 2 is reduced to the value not more than the first target value (TC1) lower than the turbine capacity when the engine E is driven at the constant speed before starting an acceleration of the internal combustion engine (E) or just before an acceleration of the internal combustion engine (E). The driving mode of the turbocharger 2 is set at the minimum capacity mode for controlling the current passing through the electric actuator 41 to close (totally close) the flow rate adjustment valve 33 to thereby close the second scroll passage 32 and for opening the first scroll passage 31.

Alternatively, in addition to the minimum capacity mode or independently, in order to increase the supercharging pressure by the first control device, the driving mode of the turbocharger 2 is set at a bypass total closing mode for controlling the current passing through the electric actuator 42 to close (totally close) the waste gate valve 35 to thereby close the bypass passage 34.

Further, in the case where the valve overlap amount is decreased to the value not more than the first specified value (OL1) less than the valve overlap amount when the engine E is driven at the constant speed before starting the acceleration of the internal combustion engine (E) or just before the acceleration of the internal combustion engine (E), the valve overlap amount is set at a minimum valve overlap amount. The minimum value of the valve overlap amount is set in the following manner. That is, by controlling the current passing through the electromagnetic actuator of the intake OCV 51 or the electromagnetic actuator of the exhaust OCV 52, a valve opening timing and a valve closing timing of the intake valve are retarded by a specified rotation angle. Alternatively, the valve opening timing and the valve closing timing of the intake valve are retarded by the specified rotation angle and a valve opening timing and a valve closing timing of the exhaust valve are advanced by a specified rotation angle.

Next, the ECU 3 calculates a specified supercharging pressure (intake manifold pressure) or a specified exhaust pressure (exhaust manifold pressure) (a specified supercharging pressure or exhaust pressure determination device).

The specified supercharging pressure (intake manifold pressure) or the specified exhaust pressure (exhaust manifold pressure) is determined in the following manner. That is, in the case where the turbine capacity of the turbocharger 2 is increased after the first control, a remaining gas ratio is estimated as needed on the basis of the three-dimensional maps shown in FIG. 4 and FIG. 5. A supercharging pressure (an intake manifold pressure) or an exhaust pressure (an exhaust manifold pressure) in which the estimated remaining gas ratio is not more than a specified value (a specified value of the remaining gas ratio) is made the specified supercharging pressure (intake manifold pressure) or the specified exhaust pressure (exhaust manifold pressure).

Next, after the ECU 3 performs the first control, the ECU 3 performs a second control to be described below at the stage (the timing t3) in which the surge tank pressure (the actual supercharging pressure) sensed by the surge tank pressure sensor 61 of the intake port pressure (supercharging pressure) sensor is increased to a specified supercharging pressure (a second pressure value (PIN2) which is higher than a first pressure value (PIN1) before starting the acceleration of the internal combustion engine (E) or just before the acceleration of the internal combustion engine (E). Alternatively, the ECU 3 performs the second control at the stage (the timing t3) in which the exhaust manifold pressure (the exhaust pressure) sensed by the exhaust port pressure sensor is increased to a second pressure value (PEX2) which is higher than a first pressure value (PEX1) before starting the acceleration of the internal combustion engine (E) or just before the acceleration of the internal combustion engine (E)

In the second control, the actuator of the turbine capacity varying mechanism is electrically controlled in such a way that the turbine capacity of the turbocharger 2 is increased to a value not less than the second target value (TC2) corresponding to a turbine capacity set in correspondence to the target supercharging pressure and the engine speed (NE). Further, in the second control, the actuator of the intake VVT or the exhaust VVT is electrically controlled in such a way that the valve overlap amount is increased to a value not less than the second specified value (OL2) corresponding to, for example, a maximum value of the valve overlap amount (the second control device).

In this regard, the second pressure value (PIN2 or PEX2) is a minimum pressure (a minimum value) among pressures in which the estimated remaining gas ratio is made not more than a specified value in the case where the second control is performed. Further, the second target value (TC2) of the turbine capacity and the second specified value (OL2) of the valve overlap amount are stored in the ROM and the EEPROM in advance. Still further, the change speed of the turbine capacity from the timing t3 to the timing t4 and the change speed of the valve overlap amount from the timing t3 to the timing t4 are calculated by the use of the three-dimensional maps (see FIGS. 6A, 6B) or the operation expression which are stored in the ROM and the EEPROM in advance. In other words, a period of time from the timing t3 to the timing t4 is changed by the surge tank pressure (or the intake air amount) and the engine speed (NE).

First, in the case where the turbine capacity of the turbocharger 2 is increased to the value not less than the second specified value (TC2) larger than the first specified value (TC1), the driving mode of the turbocharger 2 is set at the maximum capacity mode for controlling the current passing through the electric actuator 41 to open (fully open) the flow rate adjustment valve 33 to thereby open the first and second scroll passages 31, 32.

Alternatively, the driving mode of the turbocharger 2 is set at the second capacity varying mode for controlling the current passing through the electric actuator 41 to control the opening of the flow rate adjustment valve 33 to thereby partially open the second scroll passage 32.

Alternatively, in addition to the maximum capacity mode or the second capacity varying mode, or independently, for the purpose of reducing the exhaust pressure by the second control device, the driving mode of the turbocharger 2 is set at a bypass full opening mode for controlling the current passing through the electric actuator 42 to open (fully open) the waste gate valve 35 to thereby open the bypass passage 34, or the bypass passage state of the first control device is kept.

Further, in the case where the valve overlap amount is increased to the value not less than the second target value (TC2) higher than the first target value (TC1), the valve overlap amount is set at a maximum valve overlap amount, that is, a maximum value of the valve overlap amount in the following manner. That is, by controlling the current passing through the electromagnetic actuator of the intake OCV 51 or the electromagnetic actuator of the exhaust OCV 52, the valve opening timing and the valve closing timing of the intake valve are advanced by a specified rotation angle, or the valve opening timing and the valve closing timing of the intake valve are advanced by the specified rotation angle and the valve opening timing and the valve closing timing of the exhaust valve are retarded by a specified rotation angle.

Effect of First Embodiment

As described above, in the engine control system according to the present embodiment, at the time of accelerating the engine E, the first control is performed and then when the actual supercharging pressure is increased to the specified supercharging pressure, the second control is performed. In this way, at the beginning of the stage where the engine E is accelerated, the turbine capacity of the turbocharger 2 is decreased to the value not more than the first target value (for example, to the minimum capacity of the turbine capacity). This decrease in the turbine capacity of the turbocharger rapidly increases the exhaust pressure. This rapid increase in the exhaust pressure of the engine E can rapidly increase the turbine output of the turbocharger 2.

In this way, the rotation of the compressor impeller 23 is increased and hence the actual supercharging pressure on the more downstream side in the direction in which the intake air flows than the compressor impeller 23 is rapidly increased. At the same time, by decreasing the valve overlap amount of the intake valve and the exhaust valve to the value not more than the first specified value (OL1) (for example, to the minimum value of the valve overlap amount), an increase in the effect of an exhaust inference (increase in the remaining gas) caused by the increase in the exhaust pressure of the engine E can be inhibited and the flow rate of the supercharged intake air suctioned into the combustion chambers of the respective cylinders #1 to #4 of the engine E can be increased (for example, maximized). In other words, an increase in the intake air amount sent into the respective cylinders #1 to #4 of the engine E is made quicker than ever before, so that an increase in the engine output, that is, an increase in the engine torque can be made quicker than ever before.

Thereafter, when the engine E is further accelerated and is brought into a middle stage of acceleration or a latter state of acceleration or in the last stage of acceleration and hence the intake air pressure of the engine E is increased to the second pressure value to thereby establish a condition in which the engine E can be scavenged. The turbine capacity of the turbocharger 2 is increased to the value not less than the second target value (TC2). Thus, the exhaust gas pressure of the engine E is decreased and the valve overlap amount of the intake valve and the exhaust valve is increased to the value not less than the second specified value (OL2) (for example, to the maximum value of the valve overlap amount).

In this way, the remaining gas in the combustion chamber of each of the cylinders #1 to #4 of the engine E is pushed out or scavenged by the use of fresh air from the intake passage in the intake pipe 6 and the intake port of the engine. In other words, the replacing of the remaining gas in the combustion chamber of each of the cylinders #1 to #4 of the engine E by the fresh air (referred to as a scavenging effect) can be also utilized.

Hence, at the time of accelerating the engine E, by optimizing the turbine capacity of the turbocharger 2 and the valve overlap amount in correspondence to the driving state of the engine E, as shown in FIG. 2, in the valve overlap period, on the condition that the scavenging effect is larger than the effect of the exhaust interference, the valve opening period of the intake valve and the valve opening period of the exhaust valve can be made to overlap each other.

The exhaust interference means that the exhaust port pressure (the exhaust pressure) is made higher than the intake port pressure (the actual supercharging pressure) in the valve overlap period, to thereby cause a malfunction such that the combustion gas or the exhaust gas in the cylinder (the exhaust cylinder) in the exhaust stroke (EXHAUST) is made to reversely flow into the intake port.

Further, the estimated remaining gas ratio is calculated by the use of the three-dimensional map (see FIG. 4) or the operation expression which are made in advance by measuring the relationship between the surge tank pressure (or the intake air amount) and the engine speed (NE) by the experiment or the like, so that the remaining gas ratio can be estimated by a simple construction.

Still further, since the specified value of the estimated remaining gas ratio is computed based on the three-dimensional map (see FIG. 5) or the operation expression, the scavenge start timing can be determined according to the engine speed (NE) and the engine load. In this way, the scavenging effect can be maximized.

Further, the change speed of the turbine capacity of the turbocharger 2 or the change speed of the valve overlap amount of the intake valve and the exhaust valve is calculated by the use of the three-dimensional maps (see FIGS. 6A, 6B) or the operation expression which are made in advance by measuring the relationship between the surge tank pressure (or the intake air amount) and the engine speed (NE) by the experiment or the like. Thus, the turbine capacity of the turbocharger 2 or the valve overlap amount can be activated under the optimal action conditions for each operation condition of the engine E. Also, a turbo-lag can be minimized.

Still further, when the turbine capacity of the turbocharger 2 is reduced to the value not more than the first target value (TC1) at the early stage of acceleration of the engine E, the turbine capacity of the turbocharger 2 is decreased to a minimum capacity.

In other words, the effect of a rapid increase in the turbine output, which is caused by decreasing the turbine capacity of the turbocharger 2 at the early stage of acceleration of the engine E, can be maximized.

Further, when the valve overlap amount of the intake valve and the exhaust valve is decreased to the value not more than the first specified value (OL1) at the early stage of acceleration of the engine E, the valve overlap amount is decreased to a minimum value.

In other words, the effect of inhibiting the effect of the exhaust interference from being increased at the early stage of acceleration of the engine E can be maximized.

Still further, when the valve overlap amount of the intake valve and the exhaust valve is increased to the value not more than the second specified value (OL2) at the acceleration of the engine E, the valve overlap amount is increased to a maximum value. In this way, the actual supercharging pressure is made higher than the exhaust pressure, which hence can maximize the scavenging effect on the condition that the scavenging can be performed.

Construction of Second Embodiment

Figure 7:
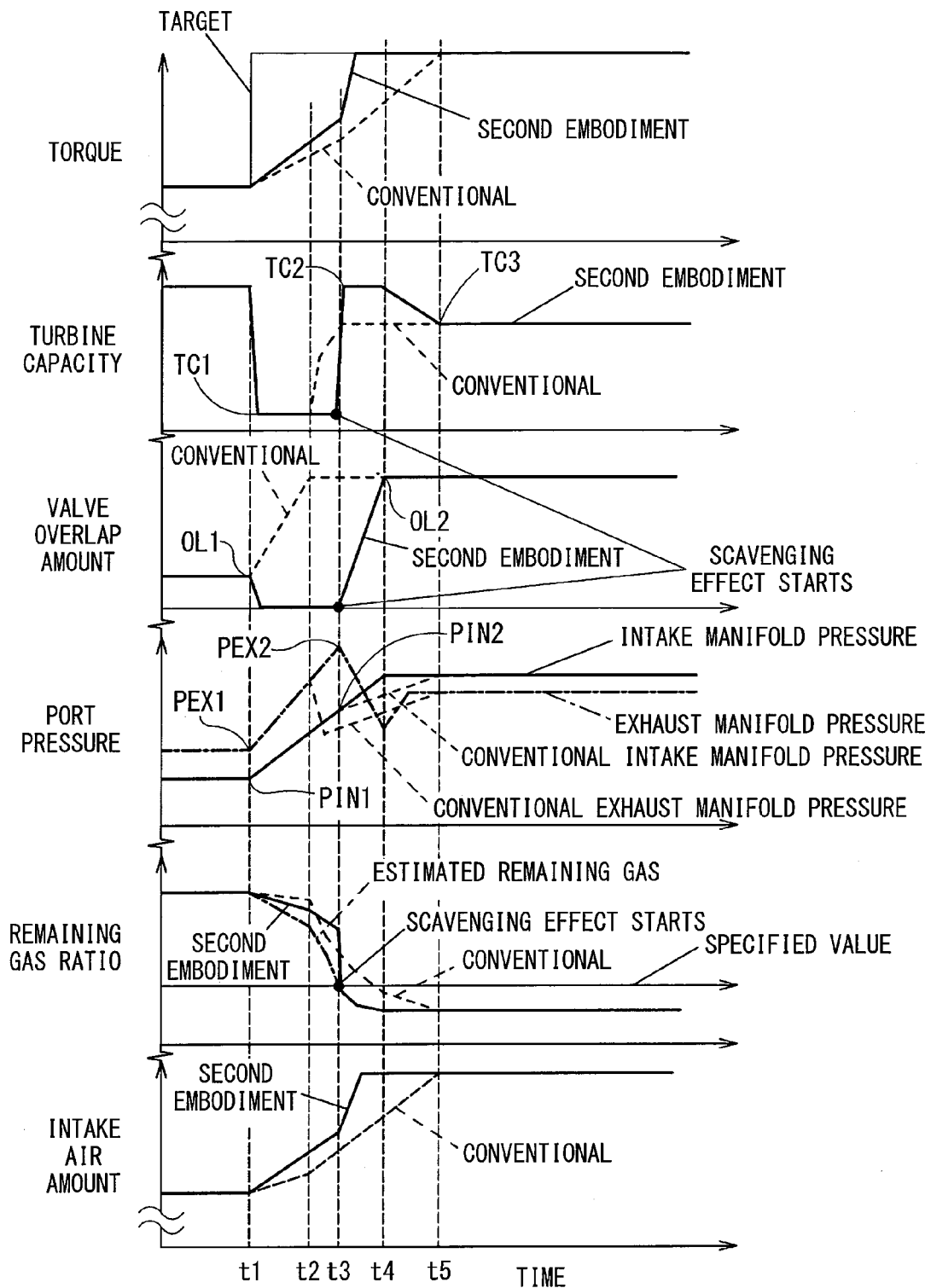
FIG. 7 is a timing chart to show changes in: the torque; the turbine capacity; the valve overlap amount; the port pressure; the remaining gas ratio; and the intake air amount of an engine (second embodiment).

FIG. 7 shows an engine control system (a second embodiment) to which a supercharging control device of an internal combustion engine according to a second embodiment is applied.

Here, the same reference characters as in the first embodiment show the same constructions or the same functions and their descriptions will be omitted.

After the ECU 3 of the present embodiment performs the first control and the second control of the first embodiment, further, at the latter stage of the acceleration in which the engine E is further accelerated, that is, at a stage in which a specified time passes after the ECU 3 starts the second control (during a period of time from the timing t3 to the timing 4), the ECU 3 of the present embodiment performs a third control for electrically controlling the actuator of the turbine capacity varying mechanism in such a way that the turbine capacity of the turbocharger 2 is decreased to a value not more than a third target value (TC3) corresponding to a turbine capacity set in correspondence to the target supercharging pressure and the engine speed (NE) (a third control device).

In this regard, the third target value (TC3) of the turbine capacity is stored in the ROM or the EEPROM in advance. Further, the change speed of the turbine capacity from the timing t4 to a timing t5 is calculated by the use of the three-dimensional map (see FIG. 6A) and the operation expression which are stored in the ROM or the EEPROM in advance. In other words, the period of time from the timing t4 to the timing t5 is changed according to the surge tank pressure (or the intake air amount) and the engine speed (NE).

In the case where the turbine capacity of the turbocharger 2 is decreased to a value not more than the third target value (TC3) lower than the second target value (TC2), the driving mode of the turbocharger 2 is set at a third capacity varying mode for controlling the current passing through the electric actuator 41 to control the opening of the flow rate adjustment valve 33 to thereby partially open the second scroll passage 32.

Further, in the present embodiment, the timing when the torque of the engine E reaches the target value is made earlier than in the first embodiment. Still further, the exhaust manifold pressure (the exhaust pressure) that is the exhaust port pressure of the engine E is made lower at the timing t4 than in the first embodiment.

Hence, by optimizing the turbine capacity of the supercharger 2 and the valve overlap amount in correspondence to the driving state of the engine E at the time of accelerating the engine E, during a period of the valve overlap, on the condition that the exhaust port pressure (the exhaust pressure) is made lower than the intake port pressure (the actual supercharging pressure) to thereby scavenge the engine E, the maximizing of the effect of decreasing the exhaust pressure of the engine E, which is produced by the increase in the turbine capacity of the supercharger 2, can be realized and the maximizing of the effect of the scavenging effect can be realized.

As described above, in the engine control system of the present embodiment, the same effect as in the first embodiment can be produced.

Modified Embodiments

In the above described embodiments, the turbocharger 2 supercharges the intake air by the use of the exhaust energy of the internal combustion engine. However, it is also recommended to employ a turbocharger of an electric type (an assist supercharging type) in which an exhaust turbine and an intake compressor are driven by the use of the driving force of an electric motor.

In the above embodiments, the flow rate adjustment valve 33 and the waste gate valve 35 are employed as the turbine capacity varying mechanism. However, it is also recommended to employ only either one of the flow rate adjustment valve 33 and the waste gate valve 35 as the turbine capacity varying mechanism.

Further, a variable nozzle for varying an opening area of a scroll passage formed in the housing of an exhaust turbine may be employed as the turbine capacity varying mechanism.

Still further, not only the multi-cylinder gasoline engine but also a multi-cylinder diesel engine may be used as the internal combustion engine. Still further, not only the multi-cylinder engine but also a single cylinder engine may be used as the internal combustion engine.

In the present embodiments, as the ECU (the control unit) 3 is employed the second control device for performing the second control described above, after the ECU 3 performs the first control, at the stage in which the intake manifold pressure (the actual supercharging pressure, the intake pressure) sensed by the intake pressure sensor 61 is increased to the second pressure value (PIN2) higher than the first pressure value (PIN1) before starting to accelerate the internal combustion engine (E) or at the stage in which the exhaust manifold pressure (the exhaust pressure) sensed by the exhaust port pressure sensor is increased to the second pressure value (PEX2) higher than the first pressure value (PEX1) before starting acceleration.

However, as the ECU (the control unit) 3 may be employed a second control device for performing the second control described above, after the ECU 3 performs the first control, at the stage in which the intake manifold pressure (the actual supercharging pressure, the intake pressure) sensed by the intake pressure sensor 61 is increased to the second pressure value (PIN2) higher than the first pressure value (PIN1) before starting to accelerate the internal combustion engine (E).

Further, as the ECU (the control unit) 3 may be employed a second control device for performing the second control described above, after the ECU 3 performs the first control, at the stage in which the exhaust manifold pressure (the exhaust pressure) sensed by the exhaust port pressure sensor is increased to the second pressure value (PEX2) higher than the first pressure value (PEX1) before starting to accelerate the internal combustion engine (E).

What is claimed is:

1. A supercharging control device of an internal combustion engine, comprising:
    an internal combustion engine having an intake valve and an exhaust valve;
    a supercharger that has a compressor and a turbine, the compressor being arranged in an intake passage communicating with an intake port of the internal combustion engine, the turbine being coupled to the compressor in such a way as to be rotated along with the compressor and being arranged in an exhaust passage communicating with an exhaust port of the internal combustion engine and that supercharges air to be suctioned into a combustion chamber of the internal combustion engine through the intake passage by the use of an exhaust pressure of the internal combustion engine;
    a turbine capacity varying mechanism capable of varying a turbine capacity of the supercharger;
    a variable-valve-timing controller capable of varying a valve overlap amount of the intake valve and the exhaust valve;
    a driving state detecting device that has an intake pressure sensor for sensing an intake pressure of the internal combustion engine or an exhaust pressure sensor for sensing the exhaust pressure of the internal combustion engine and that detects a driving state of the internal combustion engine; and
    a control device that controls the variable-valve-timing controller and the turbine capacity varying mechanism on the basis of the driving state of the internal combustion engine, wherein:
    the control device performs a first control at a time of an acceleration of the internal combustion engine,
    in the first control, the turbine capacity varying mechanism is controlled in such a way that the turbine capacity is decreased to a first turbine capacity value not more than a first target value, the first target value being lower than the turbine capacity before starting the acceleration of the internal combustion engine or just before the acceleration of the internal combustion engine, and the variable-valve-timing controller is controlled in such a way that the valve overlap amount of the intake valve and the exhaust valve is decreased to a first timing value not more than a first specified value, the first specified value being smaller than the valve overlap amount before starting the acceleration of the internal combustion engine or just before the acceleration of the internal combustion engine,
    the control device performs a second control, after performing the first control, at a stage in which the intake pressure sensed by the intake pressure sensor or the exhaust pressure sensed by the exhaust pressure sensor is increased to a second pressure value, the second pressure value being higher than a corresponding first pressure value before starting the acceleration of the internal combustion engine or just before the acceleration of the internal combustion engine,
    in the second control, the turbine capacity varying mechanism is controlled in such a way that the turbine capacity is increased to a second turbine capacity value which is not less than a second target value and is set in correspondence to the driving state of the internal combustion engine, the second target value being higher than the first target value, and the variable-valve-timing controller is controlled in such a way that the valve overlap amount is increased to a second timing value not less than a second specified value, the second specified value being larger than the first specified value, the control unit performs a third control at a stage in which a specified time passes after starting to perform the second control, and in the third control, the turbine capacity varying mechanism is controlled in such a way that the turbine capacity is decreased to third turbine capacity value not more than a third target value is set in correspondence to the driving state of the internal combustion engine and is less than the second target value.

2. A supercharging control device of an internal combustion engine as claimed in claim 1, when the control device performs the second control at the stage in which the intake pressure sensed by the intake pressure sensor or the exhaust pressure sensed by the exhaust pressure sensor is increased to the second pressure value, the control unit is configured to calculate an estimated remaining gas ratio from a two-dimensional map of a rotation speed of the internal combustion engine and the intake pressure of the internal combustion engine or an intake flow rate of the internal combustion engine, the estimated remaining gas ratio representing a ratio between a total gas quantity in a cylinder and a remaining quantity of gas which has not been burned in a previous stroke.

3. A supercharging control device of an internal combustion engine, comprising:

an internal combustion engine having an intake valve and an exhaust valve;

a supercharger that has a compressor and a turbine, the compressor being arranged in an intake passage communicating with an intake port of the internal combustion engine, the turbine being coupled to the compressor in such a way as to be rotated along with the compressor and being arranged in an exhaust passage communicating with an exhaust port of the internal combustion engine and that supercharges air to be suctioned into a combustion chamber of the internal combustion engine through the intake passage by the use of an exhaust pressure of the internal combustion engine;

a turbine capacity varying mechanism capable of varying a turbine capacity of the supercharger;

a variable-valve-timing controller capable of varying a valve overlap amount of the intake valve and the exhaust valve;

a driving state detecting device that has an intake pressure sensor for sensing an intake pressure of the internal combustion engine or an exhaust pressure sensor for sensing the exhaust pressure of the internal combustion engine and that detects a driving state of the internal combustion engine; and a control device that controls the variable-valve-timing controller and the turbine capacity varying mechanism on the basis of the driving state of the internal combustion engine, wherein:

the control device performs a first control at a time of an acceleration of the internal combustion engine, in the first control, the turbine capacity varying mechanism is controlled in such a way that the turbine capacity is decreased to a first turbine capacity value not more than a first target value, the first target value being lower than the turbine capacity before starting an acceleration of the internal combustion engine or just before an acceleration of the internal combustion engine, and the variable-valve-timing controller is controlled in such a way that the valve overlap amount of the intake valve and the exhaust valve is decreased to a first timing value not more than a first specified value, the first specified value being smaller than the valve overlap amount before starting an acceleration of the internal combustion engine or just before an acceleration of the internal combustion engine, the control device performs a second control, after performing the first control, at a stage in which the intake pressure sensed by the intake pressure sensor or the exhaust pressure sensed by the exhaust pressure sensor is increased to a second pressure value, the second pressure value being higher than a corresponding first pressure value before starting an acceleration of the internal combustion engine or just before an acceleration of the internal combustion engine, and in the second control, the turbine capacity varying mechanism is controlled in such a way that the turbine capacity is increased to a second turbine capacity value which is not less than a second target value and is set in correspondence to the driving state of the internal combustion engine higher than the first target value, and the variable-valve-timing controller is controlled in such a way that the valve overlap amount is increased to a second timing value not less than a second specified value, the second specified value being larger than the first specified value, wherein the turbine capacity varying mechanism has a first and a second scroll passage for introducing the exhaust gas into the turbine, and a valve that can vary a passage sectional area of the second scroll passage to thereby vary a flow speed or a flow rate of the exhaust gas to be introduced into the turbine, wherein, when the control device performs the first control, the control device controls the valve in such a way that the valve decreases the passage sectional area of the second scroll passage or totally closes the second scroll passage, and wherein, when the control device performs the second control, the control device controls the valve in such a way that the valve increases the passage sectional area of the second scroll passage or fully opens the second scroll passage.

4. A supercharging control device of an internal combustion engine, comprising:

an internal combustion engine having an intake valve and an exhaust valve;

a supercharger that has a compressor and a turbine, the compressor being arranged in an intake passage communicating with an intake port of the internal combustion engine, the turbine being coupled to the compressor in such a way as to be rotated along with the compressor and being arranged in an exhaust passage communicating with an exhaust port of the internal combustion engine and that supercharges air to be suctioned into a combustion chamber of the internal combustion engine through the intake passage by the use of an exhaust pressure of the internal combustion engine;

a turbine capacity varying mechanism capable of varying a turbine capacity of the supercharger;

a variable-valve-timing controller capable of varying a valve overlap amount of the intake valve and the exhaust valve;

a driving state detecting device that has an intake pressure sensor for sensing an intake pressure of the internal combustion engine or an exhaust pressure sensor for sensing the exhaust pressure of the internal combustion engine and that detects a driving state of the internal combustion engine; and a control device that controls the variable-valve-timing controller and the turbine capacity varying mechanism on the basis of the driving state of the internal combustion engine, wherein:

the control device performs a first control at a time of an acceleration of the internal combustion engine, in the first control, the turbine capacity varying mechanism is controlled in such a way that the turbine capacity is decreased to a first turbine capacity value not more than a first target value, the first target value being lower than the turbine capacity before starting the acceleration of the internal combustion engine or just before the acceleration of the internal combustion engine, and the variable-valve-timing controller is controlled in such a way that the valve overlap amount of the intake valve and the exhaust valve is decreased to a first timing value not more than a first specified value, the first specified value being smaller than the valve overlap amount before starting the acceleration of the internal combustion engine or just before the acceleration of the internal combustion engine, the control device performs a second control, after performing the first control, at a stage in which the intake pressure sensed by the intake pressure sensor or the exhaust pressure sensed by the exhaust pressure sensor is increased to a second pressure value, the second pressure value being higher than a corresponding first pressure value before starting the acceleration of the internal combustion engine or just before the acceleration of the internal combustion engine, in the second control, the turbine capacity varying mechanism is controlled in such a way that the turbine capacity is increased to a second turbine capacity value which is not less than a second target value and is set in correspondence to the driving state of the internal combustion engine, the second target value being higher than the first target value, and the variable-valve-timing controller is controlled in such a way that the valve overlap amount is increased to a second timing value not less than a second specified value, the second specified value being larger than the first specified value, the control unit performs a third control at a stage in which a specified time passes after starting to perform the second control, and in the third control, the turbine capacity varying mechanism is controlled in such a way that the turbine capacity is decreased to third turbine capacity value not more than a third target value, the third target value is set in correspondence to the driving state of the internal combustion engine and is less than the second target value, and the control device is configured to calculate a change speed of the turbine capacity or a change speed of the valve overlap amount from a two-dimensional map of a rotation speed of the internal combustion engine and the intake pressure of the internal combustion engine or an intake flow rate of the internal combustion engine.

5. A supercharging control device of an internal combustion engine, comprising:

an internal combustion engine having an intake valve and an exhaust valve;

a supercharger that has a compressor and a turbine, the compressor being arranged in an intake passage communicating with an intake port of the internal combustion engine, the turbine being coupled to the compressor in such a way as to be rotated along with the compressor and being arranged in an exhaust passage communicating with an exhaust port of the internal combustion engine and that supercharges air to be suctioned into a combustion chamber of the internal combustion engine through the intake passage by the use of an exhaust pressure of the internal combustion engine;

a turbine capacity varying mechanism capable of varying a turbine capacity of the supercharger;

a variable-valve-timing controller capable of varying a valve overlap amount of the intake valve and the exhaust valve;

a driving state detecting device that has an intake pressure sensor for sensing an intake pressure of the internal combustion engine or an exhaust pressure sensor for sensing the exhaust pressure of the internal combustion engine and that detects a driving state of the internal combustion engine; and a control device that controls the variable-valve-timing controller and the turbine capacity varying mechanism on the basis of the driving state of the internal combustion engine, wherein:

the control device performs a first control at a time of an acceleration of the internal combustion engine, in the first control, the turbine capacity varying mechanism is controlled in such a way that the turbine capacity is decreased to a first turbine capacity value not more than a first target value, the first target value being lower than the turbine capacity before starting the acceleration of the internal combustion engine or just before the acceleration of the internal combustion engine, and the variable-valve-timing controller is controlled in such a way that the valve overlap amount of the intake valve and the exhaust valve is decreased to a first timing value not more than a first specified value, the first specified value being smaller than the valve overlap amount before starting the acceleration of the internal combustion engine or just before the acceleration of the internal combustion engine, the control device performs a second control, after performing the first control, at a stage in which the intake pressure sensed by the intake pressure sensor or the exhaust pressure sensed by the exhaust pressure sensor is increased to a second pressure value, the second pressure value being higher than a corresponding first pressure value before starting the acceleration of the internal combustion engine or just before the acceleration of the internal combustion engine, in the second control, the turbine capacity varying mechanism is controlled in such a way that the turbine capacity is increased to a second turbine capacity value which is not less than a second target value and is set in correspondence to the driving state of the internal combustion engine, the second target value being higher than the first target value, and the variable-valve-timing controller is controlled in such a way that the valve overlap amount is increased to a second timing value not less than a second specified value, the second specified value being larger than the first specified value, the second specified value is set at a maximum value of the valve overlap amount, the control unit performs a third control at a stage in which a specified time passes after starting to perform the second control, and in the third control, the turbine capacity varying mechanism is controlled in such a way that the turbine capacity is decreased to third turbine capacity value not more than a third target value, the third target value is set in correspondence to the driving state of the internal combustion engine and is less than the second target value.

6. A supercharging control device of an internal combustion engine, comprising:

an internal combustion engine having an intake valve and an exhaust valve;

a supercharger that has a compressor and a turbine, the compressor being arranged in an intake passage communicating with an intake port of the internal combustion engine, the turbine being coupled to the compressor in such a way as to be rotated along with the compressor and being arranged in an exhaust passage communicating with an exhaust port of the internal combustion engine and that supercharges air to be suctioned into a combustion chamber of the internal combustion engine through the intake passage by the use of an exhaust pressure of the internal combustion engine;

a turbine capacity varying mechanism capable of varying a turbine capacity of the supercharger;

a variable-valve-timing controller capable of varying a valve overlap amount of the intake valve and the exhaust valve;

a driving state detecting device that has an intake pressure sensor for sensing an intake pressure of the internal combustion engine or an exhaust pressure sensor for sensing the exhaust pressure of the internal combustion engine and that detects a driving state of the internal combustion engine; and a control device that controls the variable-valve-timing controller and the turbine capacity varying mechanism on the basis of the driving state of the internal combustion engine, wherein:

the control device performs a first control at a time of an acceleration of the internal combustion engine, in the first control, the turbine capacity varying mechanism is controlled in such a way that the turbine capacity is decreased to a first turbine capacity value not more than a first target value, the first target value being lower than the turbine capacity before starting the acceleration of the internal combustion engine or just before the acceleration of the internal combustion engine, and the variable-valve-timing controller is controlled in such a way that the valve overlap amount of the intake valve and the exhaust valve is decreased to a first timing value not more than a first specified value, the first specified value being smaller than the valve overlap amount before starting the acceleration of the internal combustion engine or just before the acceleration of the internal combustion engine, the control device performs a second control, after performing the first control, at a stage in which the intake pressure sensed by the intake pressure sensor or the exhaust pressure sensed by the exhaust pressure sensor is increased to a second pressure value, the second pressure value being higher than a corresponding first pressure value before starting the acceleration of the internal combustion engine or just before the acceleration of the internal combustion engine, in the second control, the turbine capacity varying mechanism is controlled in such a way that the turbine capacity is increased to a second turbine capacity value which is not less than a second target value and is set in correspondence to the driving state of the internal combustion engine, the second target value being higher than the first target value, and the variable-valve-timing controller is controlled in such a way that the valve overlap amount is increased to a second timing value not less than a second specified value, the second specified value being larger than the first specified value, in the second control the control device is configured to set a target supercharging pressure on the basis of the driving state of the internal combustion engine, the turbine capacity varying mechanism is controlled in such a way that the turbine capacity is increased to a second turbine capacity value which is not less than a second target value and is set in correspondence to the driving state of the internal combustion engine, the second target value being higher than the first target value, and the variable-valve-timing controller is controlled in such a way that the valve overlap amount is increased to a second timing value not less than a second specified value, the second specified value being larger than the first specified value, the control unit performs a third control at a stage in which a specified time passes after starting to perform the second control, and in the third control, the turbine capacity varying mechanism is controlled in such a way that the turbine capacity is decreased to third turbine capacity value not more than a third target value, the third target value is set in correspondence to the driving state of the internal combustion engine and is less than the second target value.

* * * * *